(12) United States Patent
Hayoun

(10) Patent No.: US 6,892,072 B2
(45) Date of Patent: May 10, 2005

(54) METHOD OF OPTIMIZING THE SEARCH FOR CELLS IN A MOBILE TELECOMMUNICATION NETWORK

(75) Inventor: Lionel Hayoun, Creteil (FR)

(73) Assignee: NEC Corporation, Tokyo (JP)

( * ) Notice: Subject to any disclaimer, the term of this patent is extended or adjusted under 35 U.S.C. 154(b) by 74 days.

(21) Appl. No.: 10/462,728

(22) Filed: Jun. 17, 2003

(65) Prior Publication Data

US 2003/0236098 A1 Dec. 25, 2003

(30) Foreign Application Priority Data

Jun. 20, 2002 (FR) .............................. 02 07617

(51) Int. Cl.[7] .............................................. H04Q 7/32
(52) U.S. Cl. ...................... 455/442; 455/502; 370/332; 370/350; 375/366; 375/367
(58) Field of Search ................. 455/502, 503, 455/442, 437; 370/331, 332, 333, 350; 375/356, 355, 365, 366, 367

(56) References Cited

U.S. PATENT DOCUMENTS 5,950,131 A * 9/1999 Vilmur ...................... 455/434

2003/0039228 A1 * 2/2003 Shiu et al. .................. 370/331

FOREIGN PATENT DOCUMENTS

| DE | 101 48 998 A1 | 10/2001 |
| GB | 2 374 252 A | 10/2002 |
| WO | WO 98/01768 | 1/1998 |

OTHER PUBLICATIONS

United Kingdom Search Report dated Nov. 7, 2003.

* cited by examiner

*Primary Examiner*—Nick Corsaro
(74) *Attorney, Agent, or Firm*—McGinn & Gibb, PLLC

(57) ABSTRACT

A method of optimizing the search for cells in a mobile telecommunication network comprising a plurality of cells, each cell accommodating one base station exchanging synchronization data with a mobile device UE via a channel SCH, so as to allow subscribers' mobile devices to perform measurements on at least one cell adjacent to the current cell for retrieving a scrambling code specific to the adjacent cell. The method has a step of applying a digital filtering to measurement samples collected in a plurality of time windows so as to give a major weight to measurements performed in the most recent time windows.

7 Claims, 5 Drawing Sheets

| Group | Slot Number | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| 0 | $C_s^{1,0}$ | $C_s^{1,0}$ | $C_s^{2,2}$ | $C_s^{8,3}$ | $C_s^{9,4}$ | $C_s^{10,5}$ | $C_s^{15,6}$ | $C_s^{8,7}$ | $C_s^{10,8}$ | $C_s^{16,9}$ | $C_s^{2,10}$ | $C_s^{7,11}$ | $C_s^{15,12}$ | $C_s^{7,13}$ | $C_s^{16,14}$ |
| 1 | $C_s^{1,0}$ | $C_s^{1,1}$ | $C_s^{5,2}$ | $C_s^{16,3}$ | $C_s^{7,4}$ | $C_s^{3,5}$ | $C_s^{14,6}$ | $C_s^{16,7}$ | $C_s^{3,8}$ | $C_s^{10,9}$ | $C_s^{5,10}$ | $C_s^{12,11}$ | $C_s^{14,12}$ | $C_s^{12,13}$ | $C_s^{10,14}$ |
| ⋮ | | | | | | | | | | | | | | | |
| 62 | $C_s^{9,0}$ | $C_s^{11,1}$ | $C_s^{12,2}$ | $C_s^{15,3}$ | $C_s^{12,4}$ | $C_s^{9,5}$ | $C_s^{13,6}$ | $C_s^{13,7}$ | $C_s^{11,8}$ | $C_s^{14,9}$ | $C_s^{10,10}$ | $C_s^{18,11}$ | $C_s^{15,12}$ | $C_s^{14,13}$ | $C_s^{16,14}$ |
| 63 | $C_s^{9,0}$ | $C_s^{12,1}$ | $C_s^{10,2}$ | $C_s^{15,3}$ | $C_s^{13,4}$ | $C_s^{14,5}$ | $C_s^{9,6}$ | $C_s^{14,7}$ | $C_s^{15,8}$ | $C_s^{11,9}$ | $C_s^{11,10}$ | $C_s^{13,11}$ | $C_s^{12,12}$ | $C_s^{16,13}$ | $C_s^{10,14}$ |

FIG. 5

METHOD OF OPTIMIZING THE SEARCH FOR CELLS IN A MOBILE TELECOMMUNICATION NETWORK

BACKGROUND OF THE INVENTION

1. Field of the Invention

The invention resides in the field of telecommunication, and more specifically, it relates to a method of optimizing the search for cells in a mobile telecommunication network.

The invention also relates to a mobile device comprising means for optimizing the search for cells in a mobile telecommunication network.

More particularly, the invention finds its application in a telecommunication network comprising a plurality of cells, each cell accommodating a base station that exchanges synchronization data with a mobile device UE via a channel SCH to allow the mobile devices to perform measurements on at least one cell adjacent to the current cell so as to retrieve a scrambling code specific to the adjacent cell. In the telecommunication network, the synchronization data comprises an integral number of frames, each frame comprising an integral number of slots, and the channel SCH being subdivided into a primary synchronization channel used for detecting the beginning of a slot and a secondary channel used for detecting the beginning of a frame.

The invention finds its application in the search of cells by a dual mode GSM (Global System for Mobile Communications)/UMTS (Universal Mobile Telecommunications System) or single mode UMTS mobile telephone to prepare for a possible or contingent handover applying the procedure of cell search.

2. Description of the Related Art

To prepare for possible or contingent handovers, a mobile device UE engaging in communication has to identify neighboring cells. To do so, the mobile device applies a procedure of searching for cells that includes performing measurements on neighboring cells in order to switch to the cell that provides an optimal communication quality. This procedure may be implemented either in standby mode (watching mode) or in online mode (connected mode).

FIG. 1 schematically shows the case where the mobile device applies the procedure of searching for cells continuously in standby mode or at the time of initial activation. In this case, the procedure is initialized at time T1 and the processing is performed for a period D1 corresponding to an integral number N1 of time slots. At time T2 corresponding to the end of the period D1, the mobile device has the information necessary for carrying out the handover. Since all the processing is accomplished within the same time window 2 of a relatively short duration, and since the information collected within one time window is not reused in the following time window, a possible drift of the reception sampling clock does not have any effect on the performance of synchronization. The above processing is repeated in the same way in the following time window, also of a short duration D2.

FIG. 2 schematically shows the case where the mobile device applies the procedure of searching for cells in online mode (connected mode) intermittently. Contrary to the previous case, the mobile device utilizes several separate time windows 4, and combines the measurements collected in each time window 4 in a way to satisfy a given performance criterion depending specifically on the step of the cell search procedure at issue. Each time window allows a profile to be calculated and stored in memory, and at the end of each step, a specific correlation profile is calculated. In this case, the information and results from the processing of a given time window are reused in the processing performed in the following time window. Therefore, the processing time may be relatively long compared to the processing time in the continuous mode, and the effect of a drift or shift of the clock of the mobile device is more marked than with the previous case.

FIG. 3 shows an exemplary correlation profile obtained for a conventional cell search in a UMTS network. On the horizontal axe of this profile, the beginning point of a slot corresponds to the maximum correlation between a signal received by the mobile device and the primary synchronization code (PSCH). The points of maximum correlation of the elementary profiles obtained in different time windows may vary when there is a clock drift. A major problem that arises when the sampling clock of the mobile device is imprecise and/or when there is a Doppler shift between the base station with which the mobile device is communicating and the cell that the mobile should identify may be explained as follows: If windows are 120 ms apart, and if the clock performs sampling at a frequency equal to $(1+\epsilon)*4*3.84$ MHz, where $\epsilon=0.5\times10^{-6}$, rather than $4*3.84$ MHz, the points of the maximum correlation of two successive windows will be different by two peaks rather than one. This results in an ambiguity that degrades the performance of the synchronization slot and may cause the synchronization frame to fail.

Given that slot synchronization points detected in successive measurement windows are different, the correlation profile obtained by simply adding together correlation profiles associated with different measurement windows will present several peaks corresponding to different points. This is because the values of the peaks associated with different measurement windows are not added up, and the contrast or difference between the correlation peak and the threshold value representing correlation values not corresponding to the beginning of a slot is not improved.

Consequently, given that points corresponding to correlation peaks vary and they are of statistically equal values, the probability of detecting the beginning point of a slot corresponding to that obtained in the last window is small. This is because the detection is performed in a conventional manner by searching for the maximum of the average profile.

Also, the combination by simply adding together measurements with respect to different windows may lead to a global failure of the procedure because synchronization points with respect to different windows may vary.

The object of the invention is to solve this problem.

DISCLOSURE OF THE INVENTION

The invention proposes a method of optimizing the search for cells in a mobile communication network comprising a plurality of cells, each cell accommodating a base station exchanging synchronization data with a mobile device UE via a channel SCH, designed to allow subscribers' mobile devices to perform measurements on at least one cell adjacent to the current cell so as to retrieve a scrambling code specific to the adjacent cell, the synchronization data comprising an integral number of frame, each frame comprising an integer number of slots, and the channel SCH being subdivided into a primary synchronization channel comprising a primary code $C_p$ used for detecting the beginning of a slot, and a secondary channel comprising a secondary code $C_s^{i,k}$ containing $N_s$ chips used for detecting the beginning of a frame.

The method according to the invention comprises a step of applying a digital filtering to measurement samples collected in a plurality of time windows so as to give a major weight to measurements performed in the most recent time windows.

Preferably, the method comprises the following steps:

defining an integral number $N_f$ of measurement windows;

initializing the slot synchronization via the primary channel PSCH;

for each measurement window k, and for i=1 to $N_s*N_{ec}$, where $N_s$ represents the number of chips contained in a secondary code $C_s^{i,k}$, and $N_{ec}$ represents an oversampling frequency of the mobile device, determining a vector $P_k$ representing the correlation profile of the signal received by the mobile device with the primary code $C_p$;

for k=1 to $N_f$, calculating the average vector $P_m$ representing an average correlation profile;

for k=1 to $N_f$, applying a digital filtering designed to give a major weight to the most recent measurements;

detecting the maximum peak of the profile $P_m$; and identifying the point associated with the maximum peak of the profile $P_m$.

In a first embodiment of the method according to the invention, the digital filtering is linear and implemented according to the following algorithm:

for i=1 to $N_s*N_{ec}$ $$P(i)=(1-\lambda)P(i)+\lambda P_k(i),$$

where λ represents a weighting coefficient between 0 and 1.

In a second embodiment of the method according to the invention, the digital filtering is nonlinear.

The mobile device according to the invention comprises means for applying a digital filtering to measurement samples collected in a plurality of time windows so as to give a major weight to measurements performed in the most recent time windows.

According to the present invention as described above, a plurality of the measurement time windows are defined in time windows for the search of cell, and a digital filtering is applied to the measurement samples collected in a plurality of time windows so as to give a major weight to the measurements performed in most recent time windows. The method and device according to the present invention thus reduces the influence of the drift in the sampling clock of the mobile device (UE) and the influence of the Doppler shift between the base station with which the mobile device is communicating and the cell that the mobile should identify, thereby reliably providing the synchronization point.

Other characteristics and advantages of the invention will be apparent from the description below, given by way of a non-limiting example, with reference to accompanying drawings.

BRIEF DESCRIPTION OF THE DRAWINGS

FIG. 5 represents a table showing the relation between the groups of scrambling codes and associated motifs used for constructing codes that constitutes the secondary channel SSCH;

DETAILED DESCRIPTION OF THE EMBODIMENTS

The description below relates to a particular application of the invention in a UMTS network. Recall that to implement the procedure of searching for cells in the UMTS network, mobile devices use the primary and secondary synchronization channels SCH so as to identify neighboring UMTS cells as well as a beacon channel called CPICH (for Common Pilot Channel) for estimating the impulse response of the propagation channel.

The synchronization channel SCH allows the mobile devices to be synchronized with the network and retrieve a scrambling code specific to each cell. This channel does not convey information from the upper layers of the network, and it is not associated with any transport channel. The channel SCH is subdivided into two channels, a channel called primary PSCH (Primary Synchronization Channel) and a secondary channel SSCH (Secondary Synchronization Channel).

Figure 1:
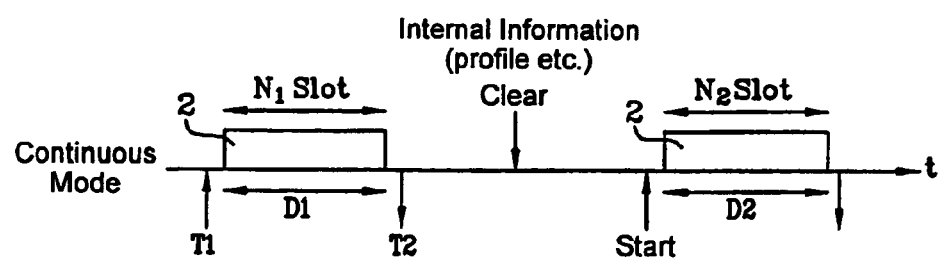
FIG. 1 schematically shows the procedure of searching for cells in standby mode (watching mode) or at the time of activation of the mobile device.
Figure 2:
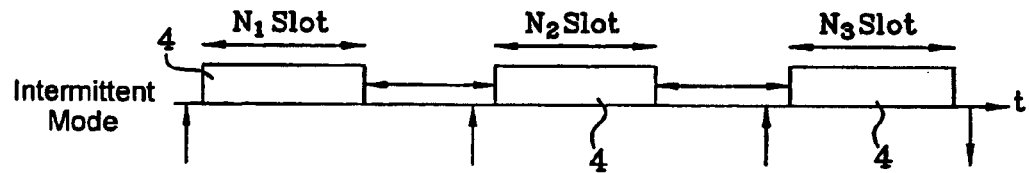
FIG. 2 schematically shows the procedure of searching for cells in online mode (connected mode)
Figure 3:
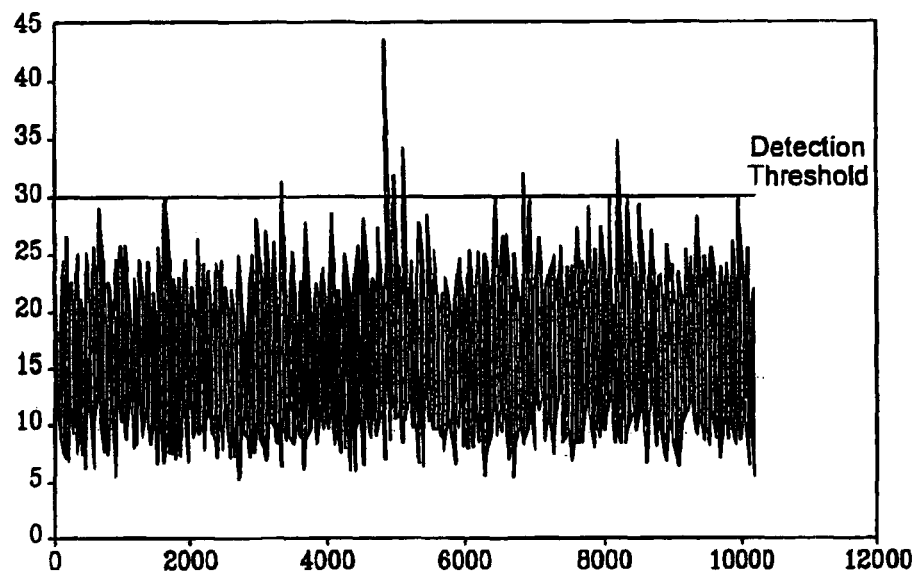
FIG. 3 schematically shows the procedure of searching for UMTS cells in the prior art.
Figure 4:
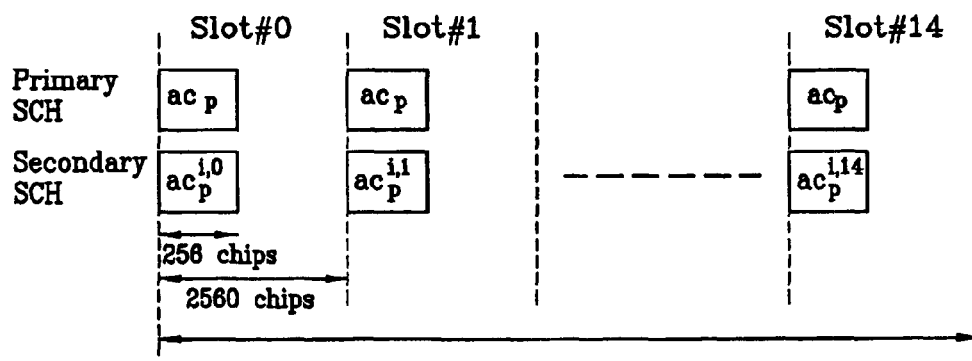
FIG. 4 schematically shows the structures of the primary synchronization-channel PSCH and secondary synchronization channel SSCH transmitted by a UMTS base station.

FIG. 4 schematically shows the structures of the channels PSCH and SSCH transmitted by a UMTS base station.

The channel PSCH consists of a primary code $C_p$ of N chips (generally N=256). A chip is a unit of information representing a symbol after the spread spectrum technique is applied. The code $C_p$ is repeated for slot by slot and it is identical for all the cells of the network. The PSCH channel is used by the mobile device UE to detect the beginning of a slot.

The channel SSCH consists of a secondary code $C_s^{i,k}$ containing 256 chips, where k=0, 1, . . . 14 and i∈{1,2,3, . . . 16}. This channel allows a mobile device UE to detect the beginning of a frame in physical channels dedicated to a specific mobile device UE and in common physical channels not dedicated to a specific mobile device UE, as well as the group to which the scrambling code belongs in the cell.

In contrast to the primary channel PSCH, codes used in the secondary channel may vary from one slot to another according to a preestablished motif selected from 64 possible motifs.

The table of FIG. 5 illustrates the relation between the groups of scrambling codes and associated motifs used for constructing the codes constituting the secondary channel SSCH.

The channel CPICH (Common Pilot Channel) consists of a predefined sequence of bits/symbols called pilots that are transmitted constantly over the cell. The rate of these bits/symbols is constant and equal to 30 Kbps (kilo bits per second), that is 15 ksps (kilo symbols per second). The channel CPICH is not associated with any transport channel.

The procedure for searching for UMTS cells comprises three steps.

The purpose of the first step is to estimate the beginning point of a slot. This is accomplished by correlating the signal received by the mobile device with the primary synchronization code (PSCH). As the frequency of chips transmitted by the UMTS base station is 3.84 MHz and as the mobile device performs oversampling, generally with a factor $N_{ec}=4$, the mobile device should distinguish $3.84 \times 10^6 * 4 * 10 \times 10^{-3}/15 = 10240$ timing hypotheses. By establishing correlations with the PSCH, it becomes possible to generate a profile with 10240 values, the maximum value of which provides the beginning point of a slot being sought.

The purpose of the second step is to identify the group of scrambling codes (64 possible hypotheses) to which the base station belongs, and the frame synchronization point (15 possible hypotheses). This is accomplished by means of correlations with the secondary synchronization code (SSCH).

The purpose of the third step is to identify the scrambling code of the base station (8 possible hypotheses) by establishing correlations to the channel CPICH.

The above steps are implemented sequentially by the mobile device UE, and their implementation assumes that the synchronization point provided by a given step is not corrupted by an error due to imprecision of the sampling clock of the mobile device UE or to a Doppler shift between the base station with which the mobile device is communicating and the cell that the mobile should identify.

Figure 6:
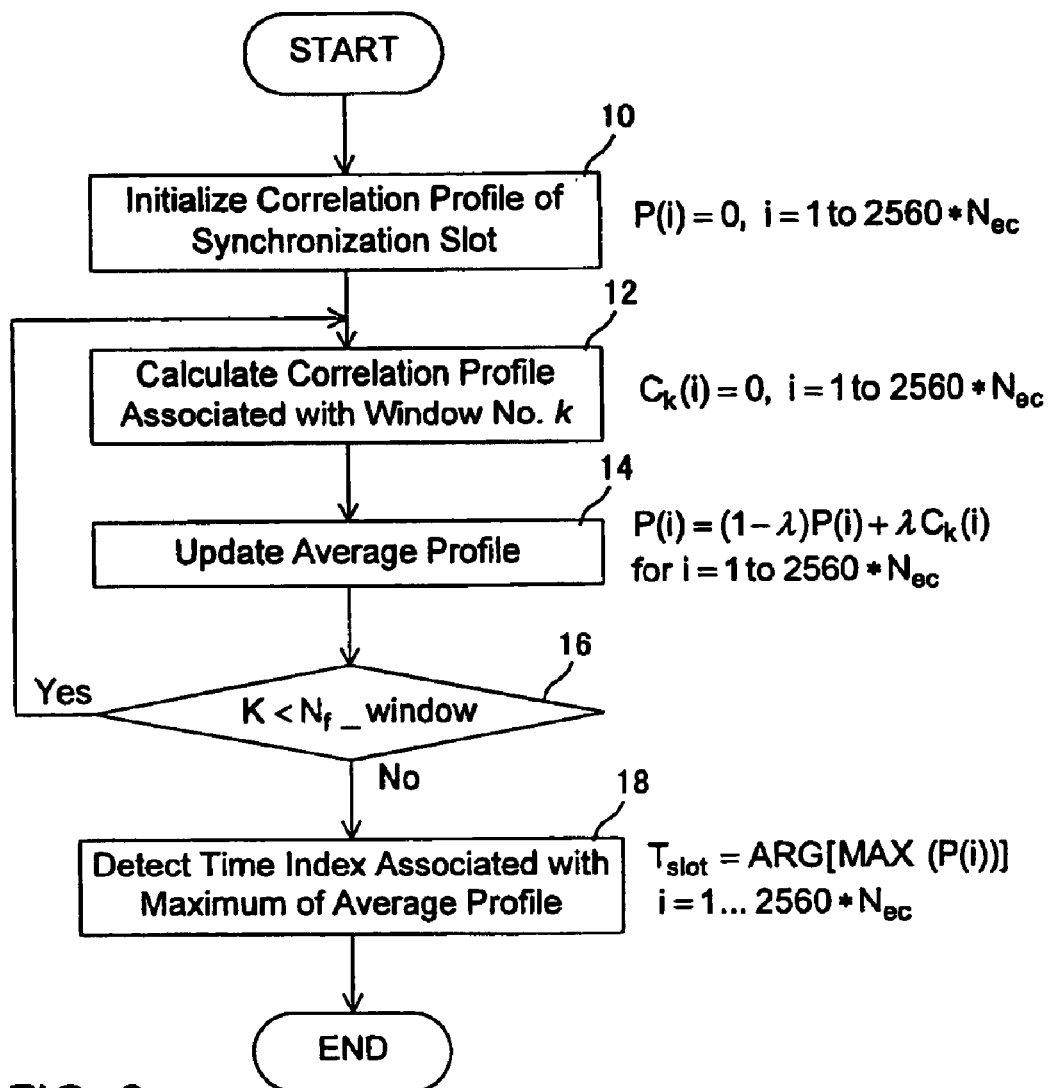
FIG. 6 is a flowchart illustrating a preferred embodiment of the method according to the invention.

FIG. 6 is a flowchart illustrating a preferred embodiment of the invention in which a digital filtering is implemented according to the following algorithm:

for i=1 to $N_s*N_{ec}$ $$P(i)=(1-\lambda)P(i)+\lambda P_k(i),$$

where $\lambda$ represents weighting coefficient between 0 and 1.

$N_f$ represents the number of measurement time windows and $N_{ec}$ the number of samples per chip. The weighting coefficient $\lambda$ is chosen so as to give major weight to present compared to past, that is to measurements performed in the most recent time windows. $P_m$ denotes a vector containing the average correlation profile, taking into account different profiles obtained in different windows. The vector $P_m$ comprises $2560*N_{ec}$ values.

Step 10 consists in initializing the correlation profile of the synchronization slot:

$$P(i)=0 \text{ for } i=1 \text{ to } 2560*N_{ec}$$

Step 12 consists in calculating for k=1 to $N_f$ the correlation profile associated with each window k. This step provides a vector $C_k$ of $2560*N_{ec}$ in dimension consisting of positive real numbers.

Step 14 consists in updating the average profile by applying the digital filtering for i=1 to $2560*N_{ec}$:

$$P(i)=(1-\lambda)P(i)+\lambda P_k(i)$$

In Step 16, verification is made to see if the number $N_f$ of windows has been reached. If so, Step 18 consists in performing the detection of the maximum correlation peak, which will indicate the beginning of a slot.

If the number $N_f$ of windows has not been reached, the procedure is repeated from Step 12.

Figure 7:
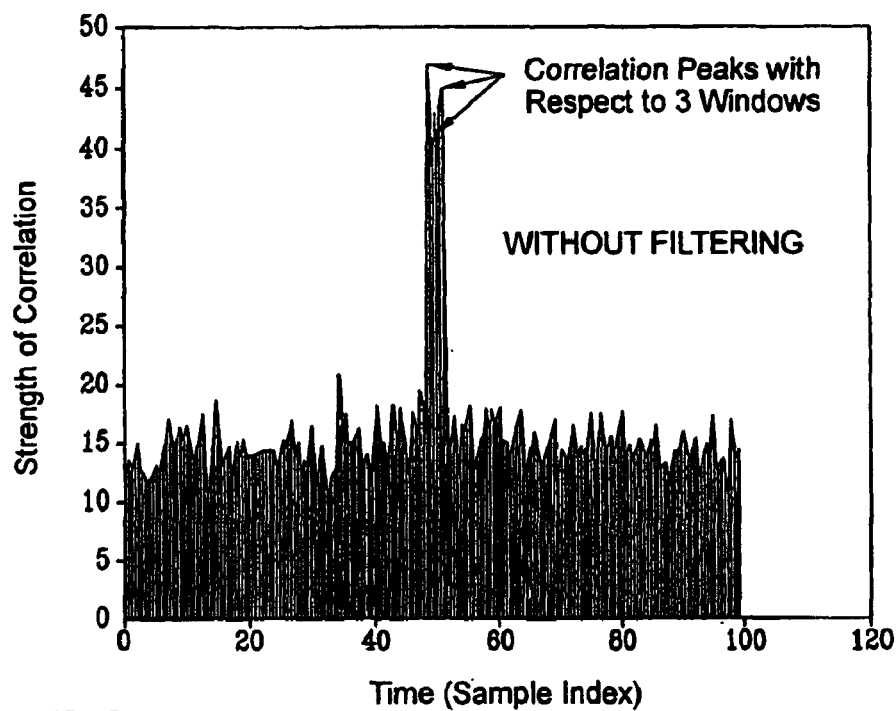
FIG. 7 shows an exemplary correlation profile obtained in the case where the method according to the invention is not applied.

FIG. 7 shows a correlation profile obtained without filtering. In this case, the detection of the maximum correlation will provides the first peak in the leftmost position in the figure, rather than the third peak that represents the most recent synchronization point and thus being the most pertinent one for the processing following the synchronization slot.

Figure 8:
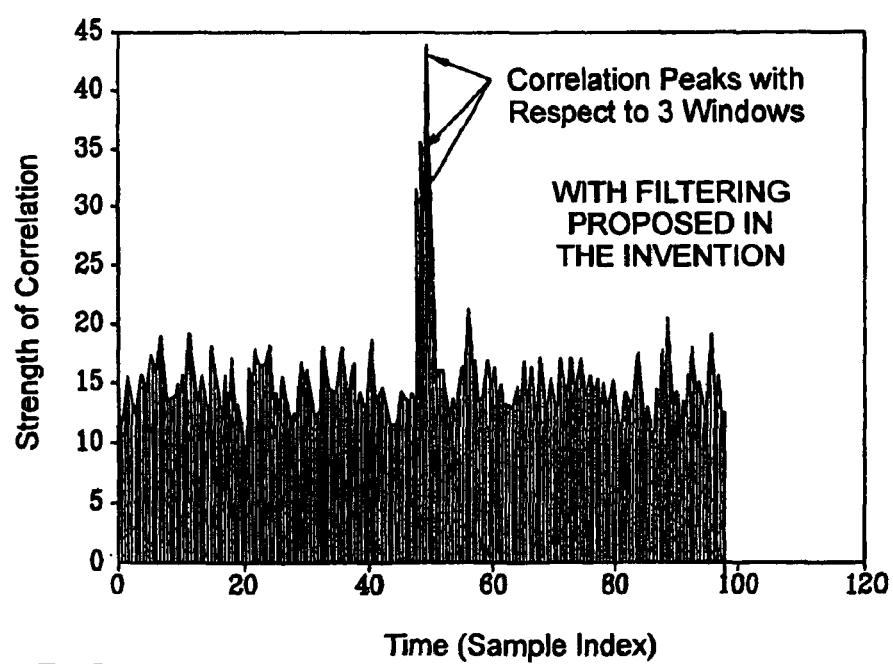
FIG. 8 shows an exemplary correlation profile obtained in a procedure of searching for UMTS cells according to the invention.

FIG. 8 shows a correlation profile obtained by the method according to the invention comprising the filtering step. In this case, the detection of the maximum correlation provides the third peak, located in the rightmost position and corresponding to the most recent synchronization point.

The method according to the invention is applied to the following cases:

mobile in GSM (GSM 900, DCS 1800 or PCS 1900) connected mode (online mode), performing measurements on neighboring UMTS FDD cells (use of idle frames of multi-frame 26);

mobile in UMTS FDD connected mode (online mode), performing measurements on neighboring UMTS FDD cells having a carrier frequency different from that of the cell in communication to the mobile device;

mobile in GPRS or EDGE or HSCSD connected mode (online mode), performing measurements on neighboring UMTS FDD cells;

mobile in CDMA 2000 connected mode (online mode), performing measurements on neighboring UMTS FDD cells.

The invention also applies to each of the first three steps of the procedure of searching for UMTS FDD cells:

Step 1: Slot level timing synchronization;

Step 2: Frame level timing synchronization and identification of the group of scrambling codes; and Step 3: Identification of the scrambling code.

What is claimed is:

1. A method of optimizing a search for cells in a mobile telecommunication network comprising a plurality of cells, each cell accommodating a base station exchanging synchronization data with a mobile device UE via a SCH channel so as to allow subscribers' mobile devices to perform measurements on at least one cell adjacent to a current cell for retrieving a scrambling code specific to said adjacent cell, said synchronization data comprising an integral number of frames, each frame comprising an integral number of slots, and said channel SCH being subdivided into a primary synchronization channel that comprises a primary code $C_p$ used for detecting a beginning of a slot, and a secondary channel that comprises a secondary code $C_s^{i,k}$ containing $N_s$ chips used for detecting a beginning of a frame, the method comprising:

applying a digital filtering to measurement samples collected in a plurality of time windows so as to give a major weight to the measurements performed in most recent time windows.

2. The method according to claim 1, further comprising:

defining an integral number $N_f$ of measurement windows;

initializing slot synchronization via the primary channel PSCH;

for each measurement window k, and for i=1 to $N_s*N_{ec}$, where $N_s$ represents a number of chips contained in a secondary code $C_s^{i,k}$, and $N_{ec}$ represents an oversampling frequency of the mobile device, determining a vector $P_k$ representing a correlation profile of a signal received by the mobile device with the primary code $C_p$;

for k=1 to $N_f$, calculating an average vector $P_m$ representing an average correlation profile;

for k=1 to $N_f$, applying a digital filtering so as to give a major weight to the most recent measurements;

detecting a maximum peak of the profile $P_m$; and identifying a point associated with the maximum peak of the profile $P_m$.

3. The method according to claim 2, wherein the digital filtering is comprises linear digital filtering, and the linear digital filtering is implemented according to an algorithm comprising:

for i=1 to $N_s*N_{ec}$ $$P(i)=(1-\lambda)P(i)+\lambda P_k(i),$$

where $\lambda$ represents a weighting coefficient between 0 and 1.

4. The method according to claim 2, wherein the digital filtering comprises nonlinear digital filtering.

5. A mobile device UE comprising:

means for exchanging synchronization data with a base station of a telecommunication network via a channel SCH, so as to perform measurements on at least one cell adjacent to a current cell for retrieving a scrambling code specific to said adjacent cell, said synchronization data comprising an integral number of frames, each frame comprising an integral number of slots, and said channel SCH being subdivided into a primary synchronization channel that comprises a primary code $C_p$ used for detecting a beginning of a slot, and a secondary synchronization channel that comprises a secondary code $C_s^{i,k}$ containing $N_s$ chips used for detecting a beginning of a frame; and means for applying a digital filtering to measurement samples collected in a plurality of time windows so as to give a major weight to the measurements performed in most recent time windows.

6. A method of optimizing a search for cells in a mobile telecommunication network comprising a plurality of cells, each cell accommodating a base station exchanging synchronization data with a mobile device UE via a SCH channel so as to allow subscribers' mobile devices to perform measurements on at least one cell adjacent to a current cell for retrieving a scrambling code specific to said adjacent cell, said synchronization data comprising a plurality of frames comprising a plurality of slots, and said channel SCH including a first synchronization channel that comprises a first code $C_p$ used for detecting a beginning of a slot, and a second channel that comprises a second code $C_s^{i,k}$ containing $N_s$ chips used for detecting a beginning of a frame, the method comprising:

applying a digital filtering to measurement samples collected in a plurality of time windows so as to give a major weight to the measurements performed in most recent time windows.

7. A mobile device, comprising:

an exchange mechanism that exchanges synchronization data with a base station of a telecommunication network via a channel SCH, so as to perform measurements on at least one cell adjacent to a current cell for retrieving a scrambling code specific to said adjacent cell, said synchronization data comprising a plurality of frames, comprising a plurality of slots, and said channel SCH including a first synchronization channel that comprises a first code $C_p$ used for detecting a beginning of a slot, and a second synchronization channel that comprises a second code $C_s^{i,k}$ containing $N_s$ chips used for detecting a beginning of a frame; and a digital filter that applies a digital filtering to measurement samples collected in a plurality of time windows so as to give a major weight to the measurements performed in most recent time windows.

* * * * *